(12) United States Patent
Koyama et al.

(10) Patent No.: US 11,018,354 B2
(45) Date of Patent: May 25, 2021

(54) FUEL CELL SYSTEM

(71) Applicant: TOYOTA JIDOSHA KABUSHIKI KAISHA, Aichi-ken (JP)

(72) Inventors: Takashi Koyama, Kariya (JP); Katsuya Komaki, Kariya (JP); Kazutoshi Wakatsuki, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 31 days.

(21) Appl. No.: 16/524,198

(22) Filed: Jul. 29, 2019

(65) Prior Publication Data

US 2020/0044264 A1    Feb. 6, 2020

(30) Foreign Application Priority Data

Aug. 1, 2018  (JP) .............................. JP2018-144808

(51) Int. Cl.
| | |
|---|---|
| *H01M 8/04029* | (2016.01) |
| *H01M 8/04701* | (2016.01) |
| *H01M 8/04119* | (2016.01) |
| *H01M 8/04291* | (2016.01) |
| *H01M 8/04007* | (2016.01) |

(52) U.S. Cl.
CPC ... *H01M 8/04029* (2013.01); *H01M 8/04059* (2013.01); *H01M 8/04074* (2013.01); *H01M 8/04164* (2013.01); *H01M 8/04291* (2013.01); *H01M 8/04701* (2013.01); *H01M 2250/20* (2013.01); *Y02E 60/50* (2013.01); *Y02T 90/40* (2013.01)

(58) Field of Classification Search
CPC ......... H01M 8/04029; H01M 8/04164; H01M 8/04291; H01M 8/04701; H01M 2250/20
See application file for complete search history.

(56) References Cited

U.S. PATENT DOCUMENTS

2004/0067399 A1*   4/2004  Kobayashi ........ H01M 8/04164
                                                                        429/429

FOREIGN PATENT DOCUMENTS

| JP | 2001-313054 A | 11/2001 | |
| KR | 20170059515 A | * 5/2017 | ........ H01M 8/04014 |

OTHER PUBLICATIONS

Machine translation of KR-20170059515-A from Korean Intellectual Property Office originally published on May 2017 to Kwon (Year: 2017).*

* cited by examiner

*Primary Examiner* — Ula C Ruddock
*Assistant Examiner* — Mary Grace Byram
(74) *Attorney, Agent, or Firm* — Hauptman Ham, LLP

(57) ABSTRACT

A fuel cell system includes: a fuel cell; an air discharge passage configured to discharge an air exhaust gas from the fuel cell; a back pressure adjusting valve provided in the air discharge passage and configured to adjust pressure of the air exhaust gas; a cooling device configured to cool the fuel cell by carrying out heat exchange using a heat medium; a water reservoir storing water; a high pressure introduction passage connecting an upstream side of the air discharge passage which is more upstream than the back pressure adjusting valve in an air flow direction to the water reservoir; and a sprinkling device configured to sprinkle the water of the water reservoir over the cooling device. The sprinkling device is configured to sprinkle the water of the water reservoir pumped by pressure of the air exhaust gas over the cooling device.

13 Claims, 5 Drawing Sheets

FUEL CELL SYSTEM

INCORPORATION BY REFERENCE

The disclosure of Japanese Patent Application No. 2018-144808 filed on Aug. 1, 2018 including the specification, drawings and abstract is incorporated herein by reference in its entirety.

BACKGROUND

1. Technical Field

The present disclosure relates to a fuel cell system including: a fuel cell that generates electric power using a chemical reaction between hydrogen and oxygen (air); and a cooling device for cooling the fuel cell.

2. Description of Related Art

Conventionally, various development have been made in fuel cell systems provided with fuel cells that generate electric power using a chemical reaction between hydrogen and oxygen (air). In a fuel cell, moisture and heat are generated by a chemical reaction during power generation. A fuel cell needs to be maintained at a constant temperature (e.g. approx. 80° C.) for power generation efficiency, and heat generated during power generation is released from a radiator to the atmosphere via a heat medium such as water.

As a technology relating to such a fuel cell system, a technology disclosed in Japanese Patent Application Publication No. 2001-313054 (JP 2001-313054 A) is known. The fuel cell system disclosed in JP 2001-313054 A is configured to collect water generated through a chemical reaction of the fuel cell by a gas-liquid separator, and to sprinkle the collected water over a radiator by running of a pump. The fuel cell system enhances cooling performance of the radiator by using latent heat of evaporation of the water having been sprinkled over the radiator.

SUMMARY

However, in the fuel cell system disclosed in JP 2001-313054 A, a pump or the like for pumping the water to the radiator is required, and thus the size of the apparatus becomes larger.

In light of the above-described points, an object of the present disclosure is to attain size reduction of a fuel cell system having a cooling device for cooling a fuel cell.

One aspect of the disclosure provides a fuel cell system. The fuel cell system includes: a fuel cell that causes an electrochemical reaction between oxygen contained in air and hydrogen; an air discharge passage that discharges an air exhaust gas containing unreacted oxygen having not been used for the electrochemical reaction from the fuel cell; a back pressure adjusting valve that is provided in the air discharge passage and adjusts pressure of the air exhaust gas; a cooling device that cools the fuel cell by carrying out heat exchange using a heat medium; a water reservoir configured to store water; a high pressure introduction passage configured to connect an upstream side of the air discharge passage which is more upstream than the back pressure adjusting valve in an air flow direction to the water reservoir; and a sprinkling device that sprinkles the water of the water reservoir over the cooling device, wherein the sprinkling device is configured to sprinkle the water of the water reservoir pumped by the pressure of the air exhaust gas over the cooling device.

Accordingly, the water in the water reservoir can be pumped to the water sprinkling passage by using the pressure of the air exhaust gas of the fuel cell so as to sprinkle the water over the cooling device. As a result, necessity for a pump or the like for pumping the water to the cooling device can be eliminated, and thus the size of the fuel cell system can be reduced.

Further, when the air back pressure of the fuel cell is higher, it can be considered that the temperature of the fuel cell is higher, and thus the necessity for cooling the fuel cell becomes higher. For this reason, the fuel cell can be properly cooled by sprinkling the water over the cooling device using the pressure of the air exhaust gas of the fuel cell.

In the fuel cell system of the above aspect, the sprinkling device may include: a water sprinkling passage through which the water supplied from the water reservoir to the cooling device flows; and a water sprinkling control valve provided in the water sprinkling passage and configured to open and close so as to control sprinkling of the water over the cooling device.

In the fuel cell system of the above aspect, the water sprinkling control valve may be configured to open when pressure of the water supplied from the water reservoir to the water sprinkling passage is greater than a predetermined pressure.

In the fuel cell system of the above aspect, the sprinkling device may include: the water sprinkling passage through which the water supplied from the water reservoir to the cooling device flows; and an air control valve provided in the high pressure introduction passage and configured to open and close so as to control sprinkling of the water over the cooling device, the air control valve being configured to open when pressure of the air exhaust gas supplied from the air discharge passage to the high pressure introduction passage is greater than a predetermined pressure.

In the fuel cell system of the above aspect, the fuel cell system may further include a gas-liquid separator configured to collect water generated through the electrochemical reaction in the fuel cell from the air exhaust gas, wherein the water reservoir may store the water collected by the gas-liquid separator.

In the fuel cell system of the above aspect, the gas-liquid separator may be provided on a downstream side of the air discharge passage which is more downstream than the back pressure adjusting valve in the air flow direction, and a check valve may be provided between the gas-liquid separator and the water reservoir, the check valve being configured to restrict movement of a fluid from the water reservoir to the gas-liquid separator.

In the fuel cell system of the above aspect, the gas-liquid separator may be provided on the upstream side of the air discharge passage, and the gas-liquid separator may be connected to the water reservoir by the high pressure introduction passage.

In the fuel cell system of the above aspect, the fuel cell system may further include a control unit configured to control the sprinkling device, wherein the water sprinkling control valve is configured to control sprinkling of the water over the cooling device by adjusting a valve opening degree of the water sprinkling control valve by the control unit.

In the fuel cell system of the above aspect, the fuel cell system may further include a temperature sensor configured to detect a temperature of the heat medium after being used for cooling the fuel cell, wherein the control unit may control the water sprinkling control valve to open when a temperature detected by the temperature sensor is higher than a predetermined temperature.

In addition, a reference numeral in a parenthesis of each component shows a correspondence with specific means as set forth in each embodiment described later.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
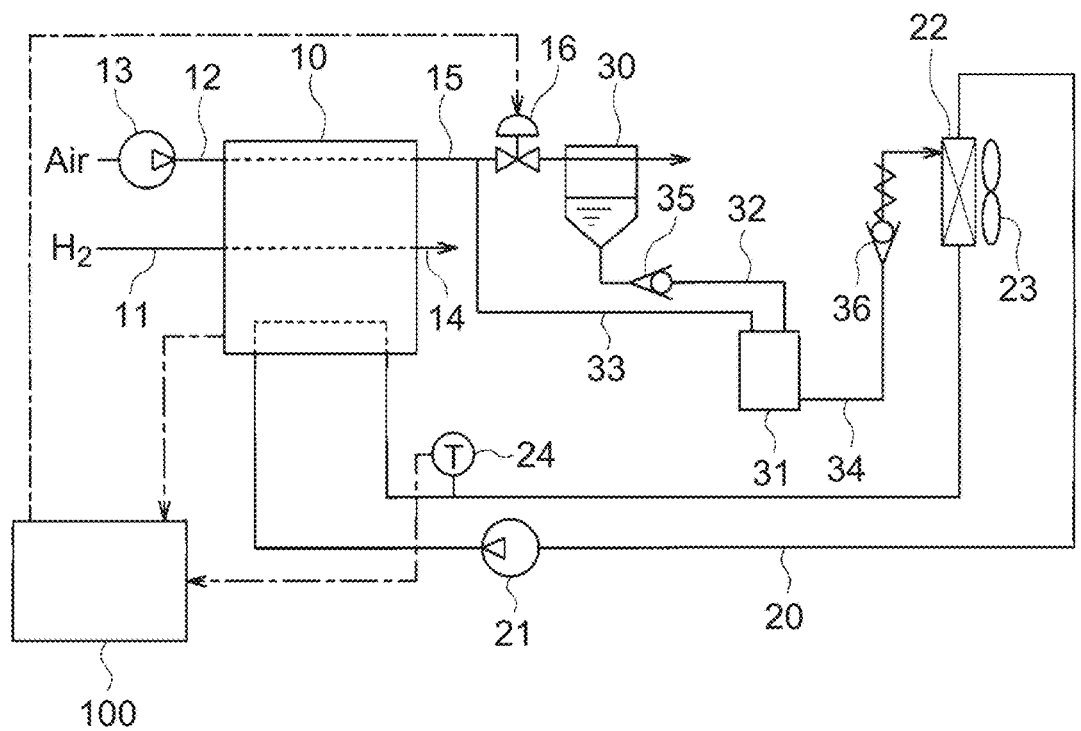
FIG. 1 is a conceptual view of a fuel cell system according to a first embodiment.

Hereinafter, embodiments of the present disclosure will be described based on the drawings. In the following respective embodiments, components identical or equivalent to each other will be denoted by the same reference numerals in the drawings.

First Embodiment

Hereinafter, a first embodiment of the present disclosure will be described based on FIGS. 1 to 4. FIG. 1 is a view showing an entire configuration of a fuel cell system according to the first embodiment. This fuel cell system is applied to a so-called fuel cell vehicle, which is a type of an electric vehicle, and supplies electric power to an electric load, such as an electric motor for vehicle traveling.

As shown in FIG. 1, the fuel cell system includes a fuel cell 10 that generates electric power by using an electrochemical reaction between hydrogen and oxygen. The fuel cell 10 is configured to supply electric power to electric equipment such as an inverter (not shown). The inverter converts direct current supplied from the fuel cell 10 into alternating current and supplies this current to a motor for traveling (load) to drive the motor.

In the first embodiment, a solid polymer electrolyte fuel cell is used as the fuel cell 10, and it has a stack structure in which a plurality of single cells each serving as a basic unit are stacked. Each single cell is configured such that an electrolyte membrane is sandwiched between a pair of electrodes.

Hydrogen is supplied to the fuel cell 10 through a hydrogen supply passage 11, and oxygen containing air is supplied through an air supply passage 12. The hydrogen is supplied, for example, from a high pressure hydrogen tank (not shown). The air is supplied by an air supply device 13 provided in the air supply passage 12.

In the fuel cell 10, the following electrochemical reaction between hydrogen and oxygen occurs, to thereby generate electric energy.

(Negative electrode side)$H_2 \rightarrow 2H^+ + 2e-$

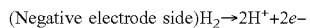

(Positive electrode side)$2H^+ + \frac{1}{2}O_2 + 2e- \rightarrow H_2O$

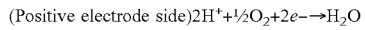

For this electrochemical reaction, electrolyte membranes in the fuel cell 10 need to be in a wet state containing moisture. Hence, it is configured that hydrogen and air supplied to the fuel cell 10 are humidified, and these humidified gases are supplied to the fuel cell 10 so as to humidify the electrolyte in the fuel cell 10. The humidification of the hydrogen and the air supplied to the fuel cell 10 can be performed by a not-shown humidifier or the like.

Unreacted hydrogen which has not been used for the above electrochemical reaction is discharged as a hydrogen exhaust gas from the fuel cell 10 through a hydrogen discharge passage 14, and unreacted oxygen which has not been used for the above electrochemical reaction is discharged as an air exhaust gas from the fuel cell 10 through an air discharge passage 15. Further, in the fuel cell 10, generated water is generated by the electrochemical reaction, and this moisture is discharged, in a state of being contained in the air exhaust gas, from the fuel cell 10 through the air discharge passage 15.

In the present embodiment, an air compressor is used as the air supply device 13, and pressurized air is supplied to the fuel cell 10 as pressurized intake air. The air supply device 13 is mechanically connected to a compressor motor (not shown).

A back pressure adjusting valve 16 is provided in the air discharge passage 15. The back pressure adjusting valve 16 can adjust an air back pressure of the fuel cell 10 by adjusting the valve opening degree, and can adjust pressure of the air in the fuel cell 10.

When an output of the fuel cell 10 becomes higher, the temperature becomes higher, and the electrolyte is thus likely to be dried, so that the power generation state may become unstable. For this reason, when the output of the fuel cell 10 becomes higher, the air back pressure is increased by the back pressure adjusting valve 16 so as to prevent the electrolyte membranes from being dried.

During the power generation, the fuel cell 10 generates heat due to the above electrochemical reaction. The fuel cell 10 needs to be maintained at a constant temperature (e.g. approx. 80° C.) during the running for power generation efficiency. In addition, since the electrolyte membranes inside the fuel cell 10 become broken due to a high temperature if the temperature becomes higher than a predetermined allowable upper limit temperature, it is necessary to maintain the fuel cell 10 at an allowable temperature or lower.

The fuel cell system includes a coolant passage 20 for circulating and supplying a coolant to the fuel cell 10. As the coolant, for example, a mixed solution of ethylene glycol and water can be used in order to prevent the coolant from being frozen at a low temperature. The coolant passage 20 is provided with a coolant pump 21 for circulating the coolant.

A radiator 22 is provided in the coolant passage 20. The radiator 22 is a heat exchanger that exchanges heat between the coolant having a high temperature due to the fuel cell 10 and the outside air blown by a fan 23, and releases heat generated by the fuel cell 10 out of the system. That is, the radiator 22 is a cooling device that cools the fuel cell 10 by carrying out heat exchange using a heat medium. The rotation of the fan 23 is controlled by a control unit 100 described later.

A temperature sensor 24 for detecting the temperature of the coolant flowing out of the fuel cell 10 is provided in the coolant passage 20 on the outlet side of the fuel cell 10. The temperature of the coolant flowing out of the fuel cell 10 (that is, an outlet temperature of the fuel cell 10) can also be referred to as the temperature of the coolant flowing into the radiator 22 (that is, an inlet temperature of the radiator 22).

A gas-liquid separator 30 for separating moisture from the air exhaust gas is provided in the air discharge passage 15 through which the air exhaust gas of the fuel cell 10 flows. The gas-liquid separator 30 is included in a water collecting section that collects the water from the fuel cell 10, which is contained in the air exhaust gas.

Below the gas-liquid separator 30, a water reservoir 31 for storing the water collected by the gas-liquid separator 30 is provided. The gas-liquid separator 30 is connected to the water reservoir 31 via a water passage 32. The water collected by the gas-liquid separator 30 is supplied to the water reservoir 31 via the water passage 32.

The water reservoir 31 is connected to an upstream side of the air discharge passage 15 which is more upstream than the back pressure adjusting valve 16 in an air flow direction by a high pressure introduction passage 33. The air exhaust gas is introduced into the water reservoir 31 from the high pressure introduction passage 33. The air exhaust gas is a high pressure air, and the water in the water reservoir 31 is pushed out by the high pressure air.

A water sprinkling passage 34 is connected to the water reservoir 31. The water pushed out of the water reservoir 31 by the high pressure air is pumped toward the water sprinkling passage 34. The pressure of the water supplied from the water reservoir 31 to the water sprinkling passage 34 depends on the pressure of the high pressure air introduced from the high pressure introduction passage 33; therefore, as the pressure of the high pressure air increases, the pressure of the water supplied from the water reservoir 31 increases.

The stored water of the water reservoir 31 is supplied to the radiator 22 via the water sprinkling passage 34. A sprinkling nozzle (not shown) is provided at a front end of the water sprinkling passage 34, and the water having flowed through the water sprinkling passage 34 is sprinkled over the surface of the radiator 22. The water sprinkled over the radiator 22 evaporates on the surface of the radiator 22. The cooling performance of the radiator 22 can be enhanced by utilizing the latent heat of evaporation of the water.

A check valve 35 is provided in the water passage 32 connecting the gas-liquid separator 30 to the water reservoir 31. The check valve 35 prevents a fluid from flowing from the water reservoir 31 toward the gas-liquid separator 30. The check valve 35 can prevent the high pressure air supplied from the high pressure introduction passage 33 from flowing into the gas-liquid separator 30. As a result, a pressure drop of the high pressure air supplied from the high pressure introduction passage 33 can be prevented, and thus pressure required for sprinkling the water over the radiator 22 can be secured.

A water sprinkling control valve 36 is provided in the water sprinkling passage 34. The water sprinkling control valve 36 is a pressure control valve configured to close when the pressure of the water supplied from the water reservoir 31 to the water sprinkling passage 34 becomes less than a predetermined pressure, and to open when the pressure becomes more than the predetermined pressure. The water sprinkling passage 34 and the water sprinkling control valve 36 correspond to a sprinkling device of the present embodiment.

Figure 2:
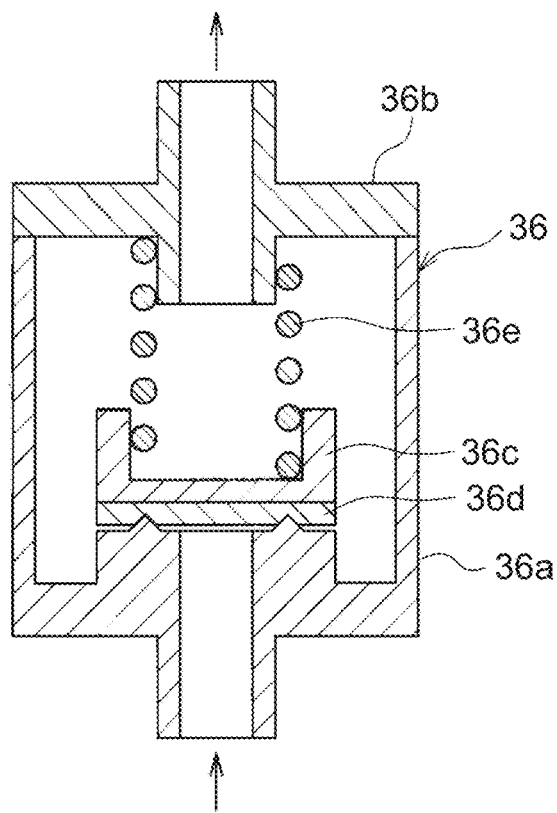
FIG. 2 is a sectional view showing a water sprinkling control valve in a closed state.
Figure 3:
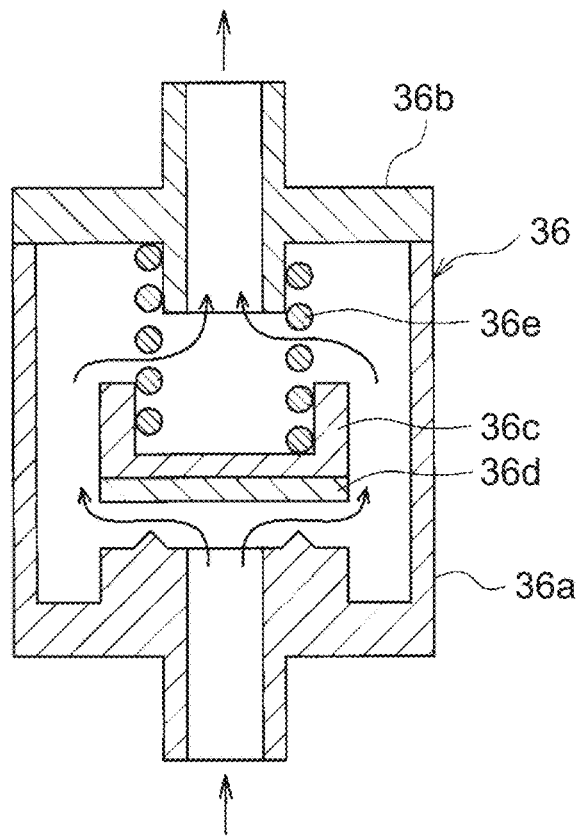
FIG. 3 is a sectional view showing the water sprinkling control valve in an open state.

As shown in FIGS. 2, 3, the water sprinkling control valve 36 includes a housing 36a, a cover 36b, a valve body 36c, a sealing portion 36d, and a spring 36e. As shown in FIG. 2, when the pressure of the water is lower than the predetermined pressure, the valve body 36c is pressed against the housing 36a by the spring 36e. At this time, the water in the water reservoir 31 is not supplied to the radiator 22. As shown in FIG. 3, when the pressure of water becomes greater than a predetermined pressure, the spring 36e is pressed and contracted, and the valve body 36c separates from the housing 36a. Thereby, the water of the water reservoir 31 is supplied to the radiator 22.

Figure 4:
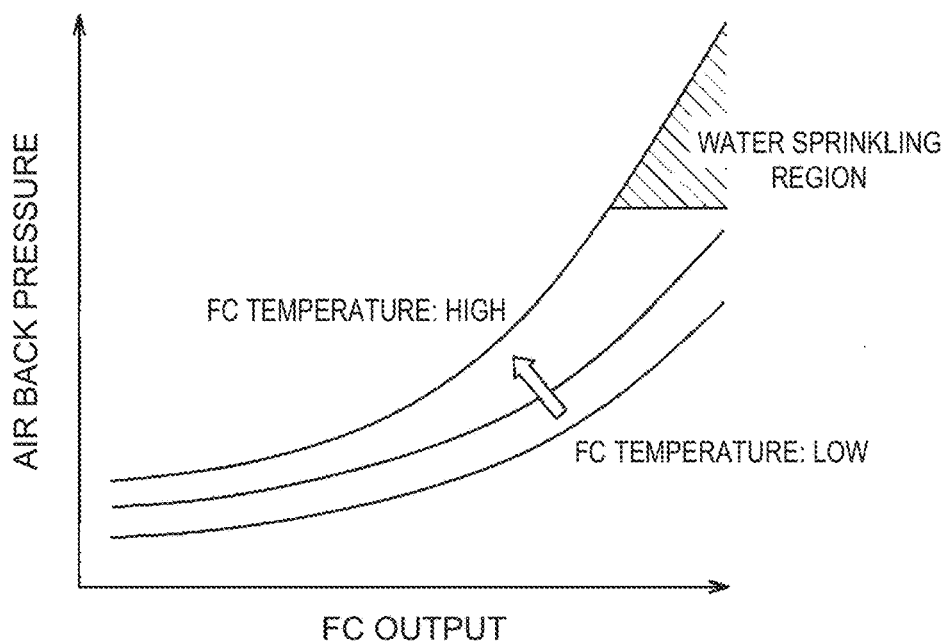
FIG. 4 is a view showing a relationship between an output of the fuel cell and an air back pressure.

FIG. 4 shows a relationship between the output of the fuel cell 10 and the air back pressure, and shows three patterns having different temperatures of the fuel cell 10. In FIG. 4, "FC output" indicates the output of the fuel cell 10, and "FC temperature" indicates the temperature of the fuel cell 10.

As shown in FIG. 4, in the pattern where the temperature of the fuel cell 10 is lower, the electrolyte membranes are more difficult to be dried; thus, the air back pressure is set lower. Accordingly, in the pattern where the temperature of the fuel cell 10 is lower, the pressure of the water supplied from the water reservoir 31 to the water sprinkling passage 34 does not become greater than the predetermined pressure even when the output of the fuel cell 10 becomes greater. Hence, the water sprinkling control valve 36 does not open, and thus the water sprinkling over the radiator 22 is not performed.

On the other hand, in the pattern where the temperature of the fuel cell 10 is higher, the electrolyte membranes are more easily dried; thus, the air back pressure is set higher. Accordingly, in the pattern where the temperature of the fuel cell 10 is higher, when the output of the fuel cell 10 becomes greater, the pressure of the water supplied from the water reservoir 31 to the water sprinkling passage 34 becomes higher than the predetermined pressure, and thus the water sprinkling control valve 36 opens to sprinkle the water over the radiator 22.

As shown in FIG. 1, a control unit 100 is provided in the fuel cell system. The control unit 100 is a control unit that controls operation of each control target device included in the fuel cell system. The control unit 100 includes a known microcomputer including a CPU, a ROM, a RAM, and others as well as peripheral circuits thereof.

Information indicating the power generation condition is input from the fuel cell 10 into the control unit 100, and the outlet temperature of the fuel cell 10 is input from the temperature sensor 24. The control unit 100 outputs a control signal to each control target device such as the back pressure adjusting valve 16. The control unit 100 can control the operation of each control target device based on the control program stored in the ROM.

According to the above-described present embodiment, the water reservoir 31 storing the water to be supplied to the radiator 22 is connected to the upstream side of the air discharge passage 15 which is more upstream than the back pressure adjusting valve 16 in the air flow direction by the high pressure introduction passage 33. Accordingly, the pressure of the air exhaust gas of the fuel cell 10 can be used to pump the water in the water reservoir 31 to the water sprinkling passage 34, to thereby sprinkle this water over the radiator 22. Therefore, necessity for a pump or the like for pumping the water to the radiator 22 can be eliminated, and thus the side of the fuel cell system can be reduced.

Further, when the air back pressure of the fuel cell 10 is greater, it is considered that the temperature of the fuel cell 10 is higher, and thus the necessity for cooling the fuel cell 10 is also higher. Therefore, by sprinkling the water over the radiator 22 using the pressure of the air exhaust gas of the fuel cell 10, it is possible to appropriately cool the fuel cell 10.

Further, in the present embodiment, the water sprinkling passage 34 is provided with the water sprinkling control valve 36 configured to open when the pressure of the water becomes greater than the predetermined pressure is provided. Thus, when the air back pressure of the fuel cell 10 is not high, that is, when the temperature of the fuel cell 10 is low, the water is not sprinkled over the radiator 22. Therefore, when necessity for cooling the fuel cell 10 is small, it is possible to avoid sprinkling unnecessary water over the radiator 22.

Second Embodiment

Next, a second embodiment of the present disclosure will be described. Hereinafter, only differences from the first embodiment will be described.

Figure 5:
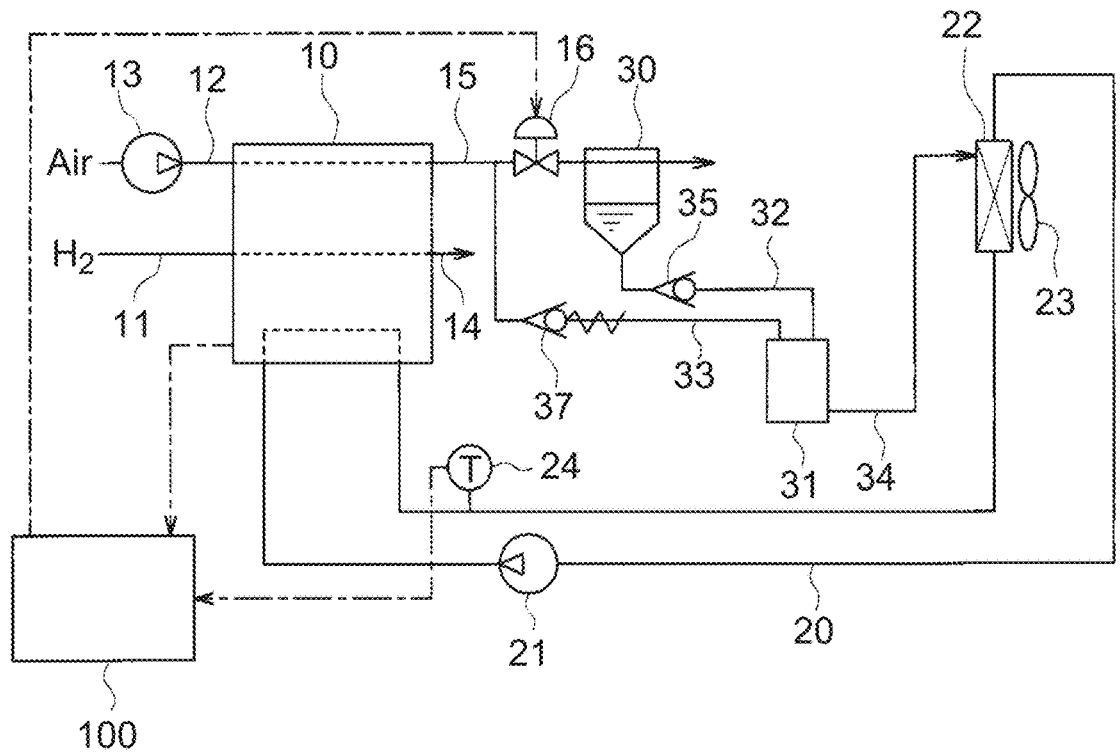
FIG. 5 is a conceptual view of a fuel cell system according to a second embodiment.

As shown in FIG. 5, in the second embodiment, the water sprinkling passage 34 is not provided with the water sprinkling control valve 36, and the high pressure introduction passage 33 is provided with an air control valve 37. The air control valve 37 is a pressure control valve configured to close when the pressure of the air exhaust gas supplied from the air discharge passage 15 to the high pressure introduction passage 33 becomes smaller than a predetermined pressure, and to open when this pressure of the air exhaust gas becomes greater than the predetermined pressure. The water sprinkling passage 34 and the air control valve 37 correspond to the sprinkling device of the present embodiment.

In the fuel cell system of the second embodiment, the air control valve 37 is configured to open when the air back pressure of the fuel cell 10 becomes greater than the predetermined pressure, to thereby introduce a high pressure air into the water reservoir 31. Accordingly, the water in the water reservoir 31 is pumped to the water sprinkling passage 34 and sprinkled over the radiator 22.

According to the above-described second embodiment, as in the first embodiment, the pressure of the air exhaust gas of the fuel cell 10 is used to pump the water in the water reservoir 31 to the water sprinkling passage 34 so as to sprinkle the water over the radiator 22. Therefore, necessity for a pump or the like for pumping the water to the radiator 22 can be eliminated, and thus the size of the fuel cell system can be reduced.

Third Embodiment

Next, a third embodiment of the present disclosure will be described. Hereinafter, only differences from the above respective embodiments will be described.

Figure 6:
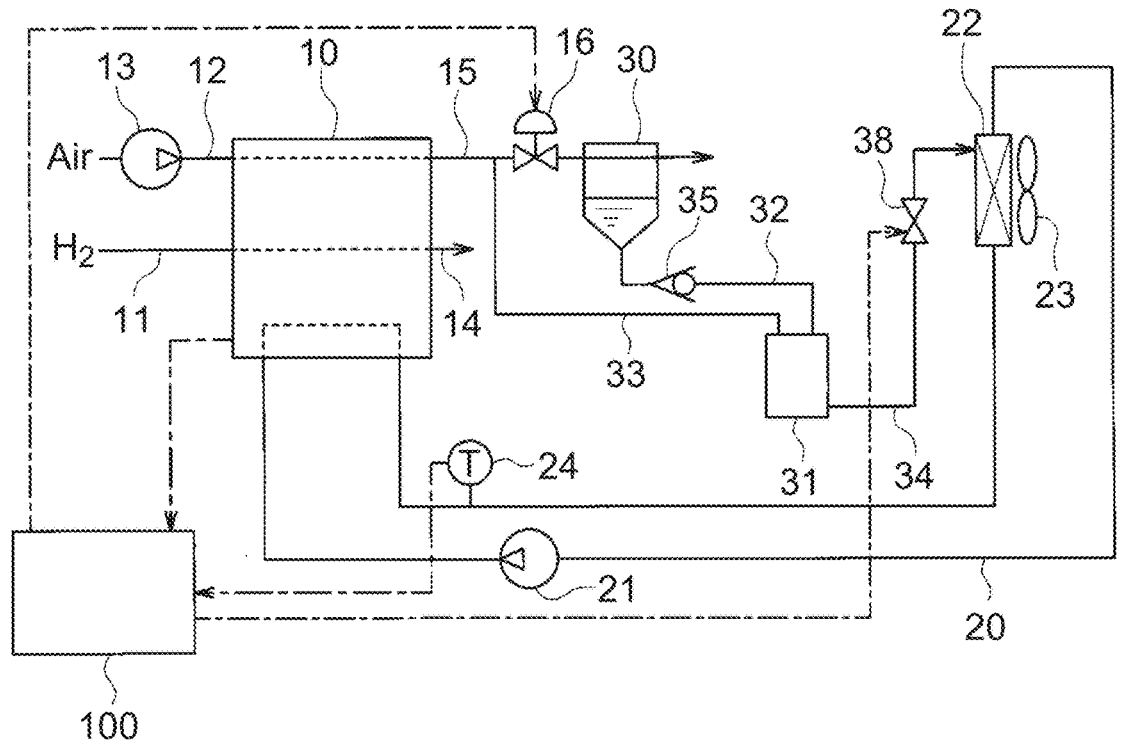
FIG. 6 is a conceptual view of a fuel cell system according to a third embodiment.

As shown in FIG. 6, in the third embodiment, the water sprinkling passage 34 is provided with a water sprinkling control valve 38. The water sprinkling control valve 38 of the third embodiment is configured as a flow rate control valve capable of adjusting a flow of the water flowing through the water sprinkling passage 34 at any flow rate by appropriately adjusting the valve opening degree of the valve. The water sprinkling control valve 38 operates based on a control signal from the control unit 100. The water sprinkling passage 34 and the water sprinkling control valve 38 correspond to the sprinkling device of the present embodiment.

The control unit 100 may be configured to control the water sprinkling control valve 38 to open when the outlet temperature of the fuel cell 10 becomes higher than a predetermined temperature. Alternatively, the control unit 100 may be configured to control the water sprinkling control valve 38 to open when the output of the fuel cell 10 becomes greater than a predetermined value. Thus, when necessity of cooling the fuel cell 10 is high, the water can be sprinkled over the radiator 22.

In addition, the control unit 100 may be configured to adjust a sprinkling amount of the water over the radiator 22 by adjusting the opening degree of the water sprinkling control valve 38. For example, as the outlet temperature of the fuel cell 10 is higher, or as the output of the fuel cell 10 is greater, the opening degree of the water sprinkling control valve 38 can be greater, and the sprinkling amount of the water over the radiator 22 can be increased. Thus, the sprinkling amount of the water over the radiator 22 can be appropriately adjusted in accordance with the temperature of the fuel cell 10.

Fourth Embodiment

Next, a fourth embodiment of the present disclosure will be described. Hereinafter, only differences from the above respective embodiments will be described.

Figure 7:
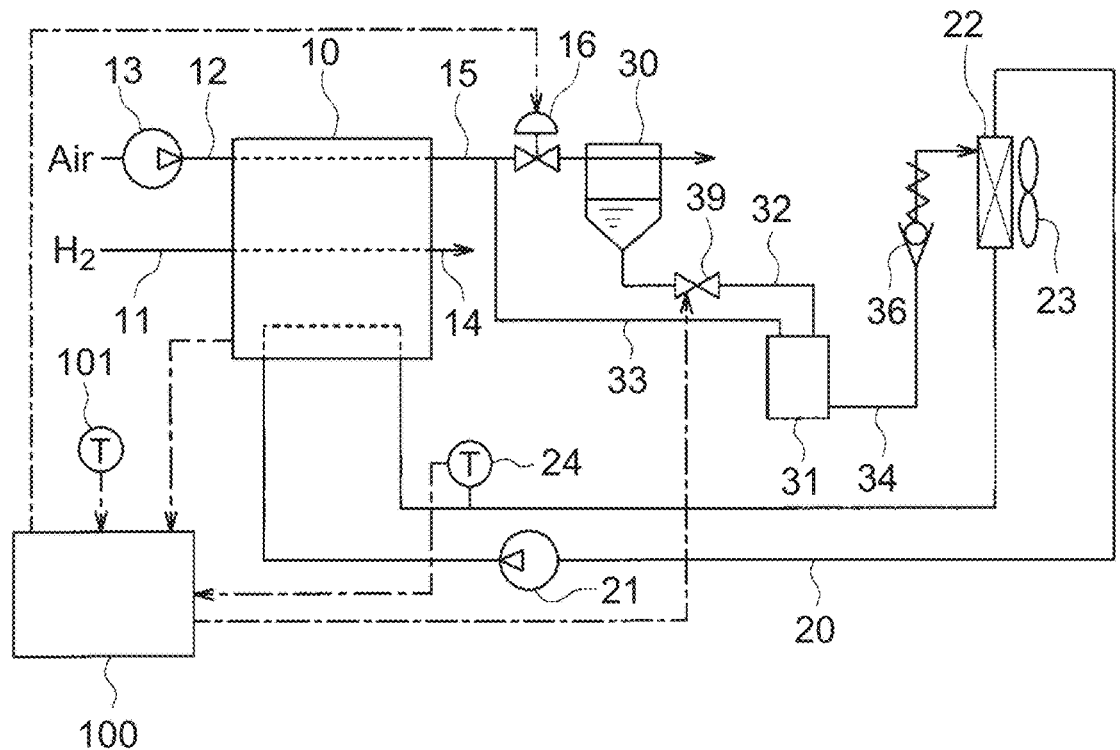
FIG. 7 is a conceptual view of a fuel cell system according to a fourth embodiment.

As shown in FIG. 7, in the fourth embodiment, the water passage 32 connecting the gas-liquid separator 30 to the water reservoir 31 is provided with an on-off valve 39. The on-off valve 39 is configured to open and close a flow passage of the water passage 32 based on a control signal from the control unit 100.

The fuel cell system is provided with an outside air temperature sensor 101 for detecting an outside air temperature. A sensor signal of the outside air temperature sensor 101 is input into the control unit 100. The control unit 100 controls the on-off valve 39 to open when the outside air temperature is higher than a predetermined temperature (e.g. 10° C.), and controls the on-off valve 39 to close when the outside air temperature is lower than the predetermined temperature. Accordingly, when the outside air temperature is lower than the predetermined temperature, the water is not supplied to the water reservoir 31 from the gas-liquid separator 30. Accordingly, the water reservoir 31 can be prevented from being filled with the water in a low temperature environment like the winter season; therefore, it is possible to prevent that the storage water becomes frozen and the water reservoir 31 is thus damaged.

Fifth Embodiment

Next, a fifth embodiment of the present disclosure will be described. Hereinafter, only differences from the above respective embodiments will be described.

Figure 8:
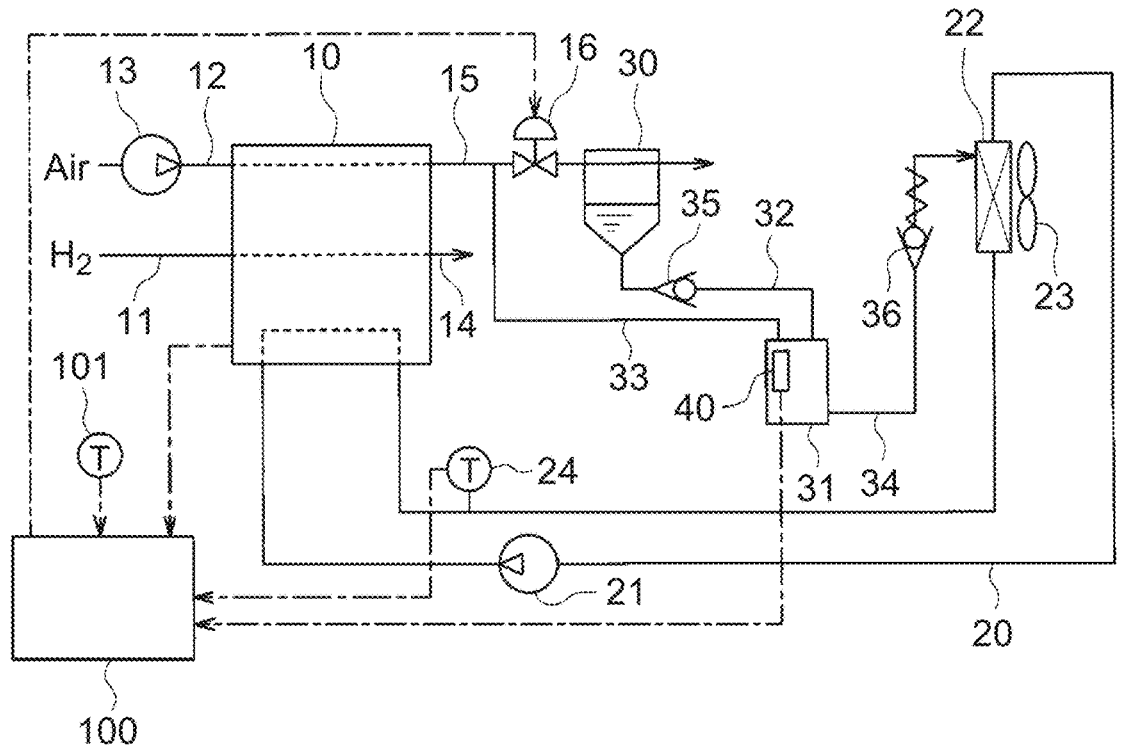
FIG. 8 is a conceptual view of a fuel cell system according to a fifth embodiment.

As shown in FIG. 8, the water reservoir 31 of the fifth embodiment is provided with a liquid level sensor 40 for detecting a water level of the stored water. A sensor signal from the liquid level sensor 40 is input into the control unit 100. When the outside air temperature is lower than a predetermined temperature (e.g. 10° C.) and the water level of the water reservoir 31 is higher than a predetermined value (e.g. 80% of a full water), the control unit 100 reduces the opening degree of the back pressure adjusting valve 16. As a result, the air back pressure increases, and the stored water in the water reservoir 31 is discharged through the water sprinkling passage 34. Accordingly, the water reservoir 31 can be prevented from being filled with the water in a low temperature environment like the winter season; therefore, it is possible to prevent that the storage water becomes frozen and the water reservoir 31 is thus damaged.

Further, when no liquid level sensor 40 is provided and the outside air temperature is lower than the predetermined temperature (e.g. 10° C.), the opening degree of the back pressure adjusting valve 16 may be periodically reduced so as to drain the stored water in the water reservoir 31.

Sixth Embodiment

Next, a sixth embodiment of the present disclosure will be described. Hereinafter, only differences from the above respective embodiments will be described.

Figure 9:
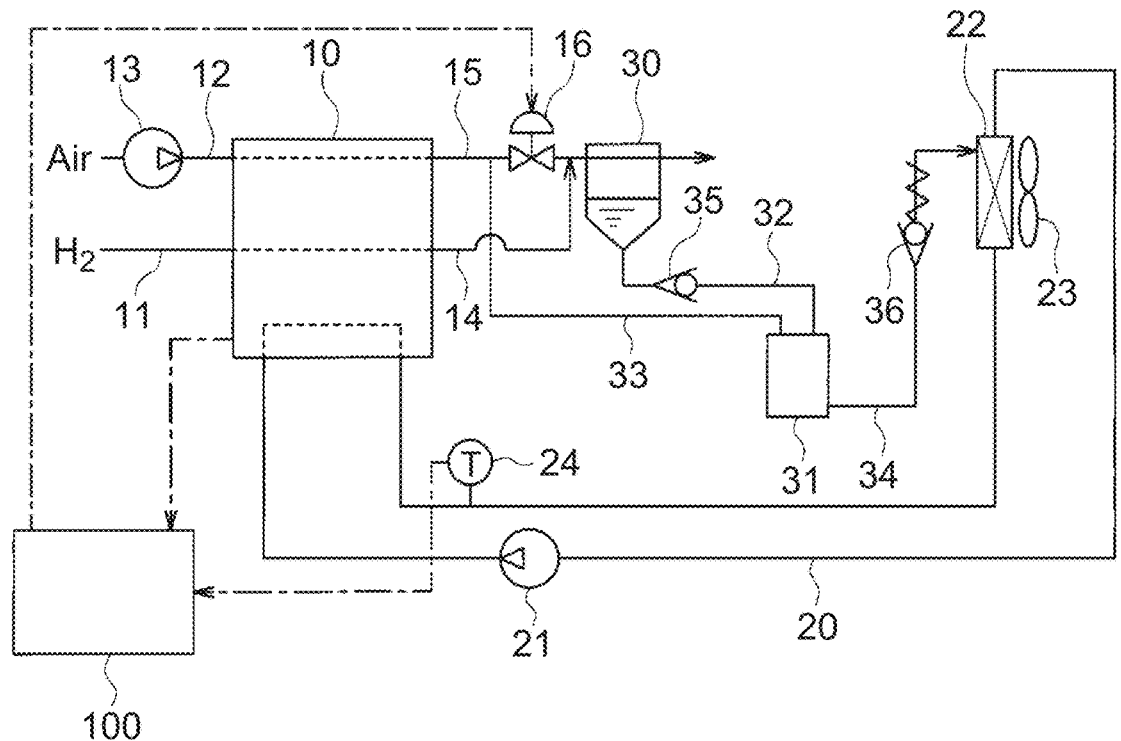
FIG. 9 is a conceptual view of a fuel cell system according to a sixth embodiment.

As shown in FIG. 9, in the sixth embodiment, a downstream end of the hydrogen discharge passage 14 is connected to a part of the air discharge passage 15 located between the back pressure adjusting valve 16 and the gas-liquid separator 30. Therefore, the hydrogen exhaust gas flowing through the hydrogen discharge passage 14 joins the air exhaust gas in the air discharge passage 15, and the hydrogen exhaust gas is supplied together with the air exhaust gas to the gas-liquid separator 30.

A part of the moisture generated by the electrochemical reaction of the fuel cell 10 moves from an air electrode side to a hydrogen electrode side through the electrolyte membranes and is discharged from the fuel cell 10 in a state of being contained in the hydrogen exhaust gas. Accordingly, the hydrogen exhaust gas along with the air exhaust gas can be supplied to the gas-liquid separator 30, to thereby also collect the moisture having moved to the hydrogen electrode side of the fuel cell 10.

Seventh Embodiment

Next, a seventh embodiment of the present disclosure will be described. Hereinafter, only differences from the above respective embodiments will be described.

Figure 10:
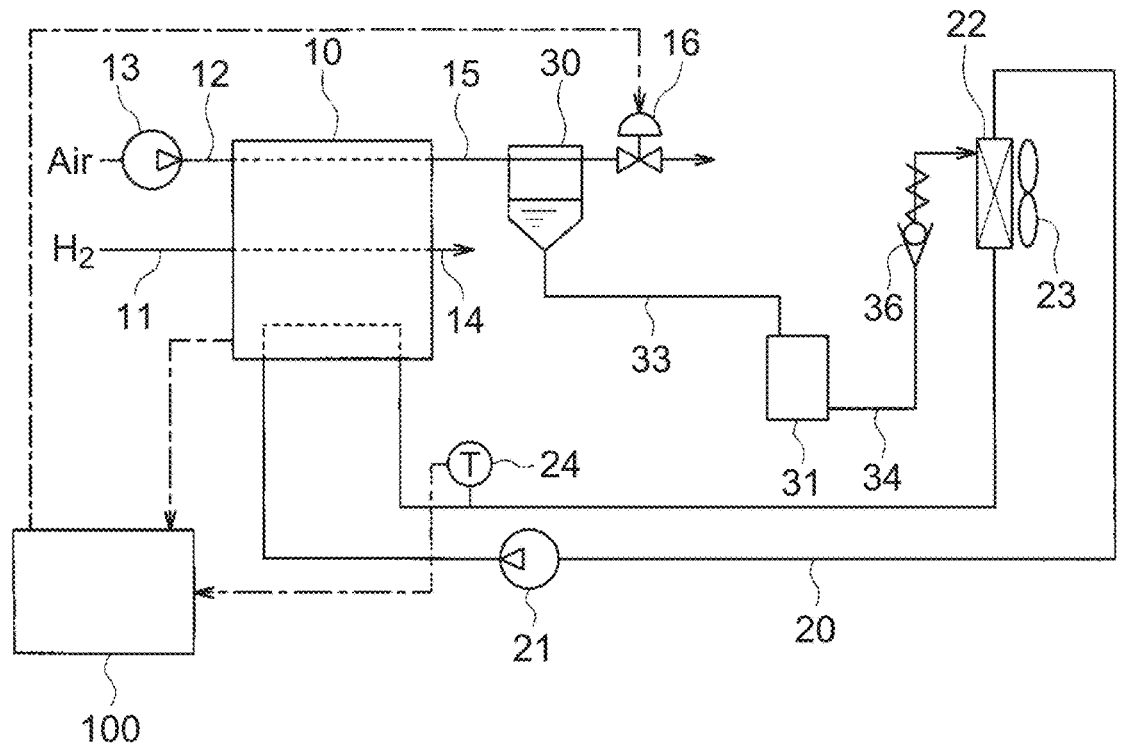
FIG. 10 is a conceptual view of a fuel cell system according to a seventh embodiment.

As shown in FIG. 10, in the seventh embodiment, the gas-liquid separator 30 is provided on an upstream side of the air discharge passage 15 which is more upstream than the back pressure adjusting valve 16 in the air flow direction. The gas-liquid separator 30 is connected to the water reservoir 31 through a high pressure introduction passage 33. Hence, the moisture collected from the air exhaust gas in the gas-liquid separator 30 is supplied to the water reservoir 31 via the high pressure introduction passage 33. That is, the high pressure introduction passage 33 of the seventh embodiment also serves as the water passage 32 in each of the respective embodiments.

When the passage of the high pressure introduction passage 33 is blocked by a liquid water, the liquid water does not flow from the gas-liquid separator 30 to the water reservoir 31. Hence, it is desirable to secure a sufficient flow passage diameter (e.g. a diameter of approx. 10 mm) for the high pressure introduction passage 33.

Also with the configuration of the seventh embodiment, the water in the water reservoir 31 can be pumped to the water sprinkling passage 34 by using the pressure of the air exhaust gas of the fuel cell 10 so as to be sprinkled over the radiator 22. Therefore, necessity for a pump or the like for pumping the water to the radiator 22 can be eliminated, and thus the size of the fuel cell system can be reduced.

OTHER EMBODIMENTS

The present disclosure is not limited to the above-described embodiments, and can be variously modified as follows without departing from the spirit of the present disclosure. In addition, the means disclosed in each of the above embodiments may be combined as appropriate in the feasible range.

For example, in each of the above embodiments, it is configured to supply the water reservoir 31 with the water collected from the air exhaust gas by the gas-liquid separator 30. However, the present disclosure is not limited to this, it may be configured to supply the water reservoir 31 with water from the outside, and to sprinkle this water over the radiator 22. In this case, the gas-liquid separator 30 can be omitted.

What is claimed is:

1. A fuel cell system comprising:
   a fuel cell that cases an electrochemical reaction between oxygen contained in air and hydrogen;
   an air discharge passage configured to discharge an air exhaust gas containing unreacted oxygen having not been used for the electrochemical reaction from the fuel cell;
   a back pressure adjusting valve provided in the air discharge passage and configured to adjust pressure of the air exhaust gas;
   a cooling device configured to cool the fuel cell by carrying out heat exchange using a heat medium;
   a water reservoir configured to store water;
   a high pressure introduction passage configured to connect an upstream side of the air discharge passage which is more upstream than the back pressure adjusting valve in an air flow direction to the water reservoir; and
   a sprinkling device configured to sprinkle the water of the water reservoir over the cooling device,
   wherein
   the sprinkling device is configured to sprinkle the water of the water reservoir pumped by the pressure of the air exhaust gas over the cooling device,
   the sprinkling device includes a water sprinkling passage through which the water supplied from the water reservoir to the cooling device flows, and
   the high pressure introduction passage is connected to the water reservoir to supply the air exhaust gas to the water reservoir to pump the water in the water reservoir to the water sprinkling passage.

2. The fuel cell system according to claim 1, wherein the sprinkling device includes:
   a water sprinkling control valve provided in the water sprinkling passage and configured to open and close so as to control sprinkling of the water over the cooling device.

3. The fuel cell system according to claim 2, wherein the water sprinkling control valve is configured to open when pressure of the water supplied from the water reservoir to the water sprinkling passage is greater than a predetermined pressure.

4. The fuel cell system according to claim 1, wherein the sprinkling device includes:
   an air control valve provided in the high pressure introduction passage and configured to open and close so as to control sprinkling of the water over the cooling device, the air control valve being configured to open when the pressure of the air exhaust gas supplied from the air discharge passage to the high pressure introduction passage is greater than a predetermined pressure.

5. The fuel cell system according to claim 1, further comprising:
a gas-liquid separator configured to collect water generated through the electrochemical reaction in the fuel cell from the air exhaust gas,
wherein
the water reservoir stores the water collected by the gas-liquid separator.

6. The fuel cell system according to claim 5, wherein
the gas-liquid separator is provided on a downstream side of the air discharge passage which is more downstream than the back pressure adjusting valve in the air flow direction, and
a check valve is provided between the gas-liquid separator and the water reservoir, the check valve being configured to restrict movement of a fluid from the water reservoir to the gas-liquid separator.

7. The fuel cell system according to claim 5, wherein
the gas-liquid separator is provided on the upstream side of the air discharge passage, and
the gas-liquid separator is connected to the water reservoir by the high pressure introduction passage.

8. The fuel cell system according to claim 2, further comprising:
a control unit configured to control the sprinkling device, wherein
the water sprinkling control valve is configured to control sprinkling of the water over the cooling device by adjusting a valve opening degree of the water sprinkling control valve by the control unit.

9. The fuel cell system according to claim 8, further comprising:
a temperature sensor configured to detect a temperature of the heat medium after being used for cooling the fuel cell,
wherein
the control unit controls the water sprinkling control valve to open when the temperature detected by the temperature sensor is higher than a predetermined temperature.

10. The fuel cell system according to claim 4, wherein
the high pressure introduction passage is connected to the water reservoir to supply the air exhaust gas to the water reservoir to pump the water in the water reservoir to the water sprinkling passage, and
the air control valve provided in the high pressure introduction passage is configured to open and close so as to control supply of the air exhaust gas to the water reservoir to thereby control pumping of the water in the water reservoir to the water sprinkling passage.

11. The fuel cell system according to claim 5, further comprising:
a control unit;
a water passage connecting the gas-liquid separator and the water reservoir; and
an on-off valve in the water passage between the gas-liquid separator and the water reservoir,
wherein
the on-off valve is configured to open and close the water passage based on a control signal from the control unit.

12. The fuel cell system according to claim 11, wherein
the control unit is configured to
control the on-off valve to open the water passage in response to an outside air temperature being higher than a predetermined temperature, and
control the on-off valve to close the water passage in response to the outside air temperature being lower than the predetermined temperature.

13. The fuel cell system according to claim 5, further comprising:
a hydrogen discharge passage connected to the fuel cell to discharge unreacted hydrogen, which has not been used for the electrochemical reaction, from the fuel cell,
wherein
the gas-liquid separator is connected to the air discharge passage, and
a downstream end of the hydrogen discharge passage is connected to a part of the air discharge passage located between the back pressure adjusting valve and the gas-liquid separator.

* * * * *